United States Patent [19]

Nomura et al.

[11] Patent Number: 5,327,184
[45] Date of Patent: Jul. 5, 1994

[54] ZOOM LENS BARREL WITH FOCAL LENGTH DETECTOR

[75] Inventors: Hiroshi Nomura; Norio Sato; Nobuaki Aoki, all of Tokyo, Japan

[73] Assignee: Asahi Kogaku Kogyo Kabushiki Kaisha, Tokyo, Japan

[21] Appl. No.: 46,794

[22] Filed: Apr. 16, 1993

[30] Foreign Application Priority Data

| Apr. 17, 1992 | [JP] | Japan | 4-024857 |
| Apr. 17, 1992 | [JP] | Japan | 4-024858 |
| Apr. 17, 1992 | [JP] | Japan | 4-024859 |
| Apr. 17, 1992 | [JP] | Japan | 4-024860 |

[51] Int. Cl.$^5$ .............................................. G03B 1/18
[52] U.S. Cl. ................................................ 354/195.1
[58] Field of Search ........... 354/195.1, 195.11, 195.12, 354/195.13

[56] References Cited

U.S. PATENT DOCUMENTS

| 4,717,933 | 1/1988 | Ando et al. .................... 354/409 |
| 4,936,664 | 6/1990 | Haraguchi et al. ............ 354/195.12 |
| 4,944,030 | 7/1990 | Haraguchi et al. ............ 354/195.12 |
| 4,967,218 | 10/1990 | Numako et al. ............... 354/195.12 |
| 4,999,656 | 3/1991 | Shimizu et al. ................ 354/195.12 |
| 5,012,273 | 4/1991 | Haraguchi et al. ............ 354/195.12 |
| 5,016,032 | 5/1991 | Haraguchi et al. ............ 354/195.12 |
| 5,051,764 | 9/1991 | Nomura ......................... 354/195.1 |
| 5,142,315 | 8/1992 | Haraguchi et al. ............ 354/195.12 |
| 5,144,493 | 9/1992 | Nomura ......................... 354/700 |
| 5,150,145 | 9/1992 | Haraguchi et al. ............ 354/195.12 |
| 5,155,515 | 10/1992 | Kohmoto et al. ............. 354/195.1 |
| 5,157,429 | 10/1992 | Haraguchi et al. ............ 354/195.12 |
| 5,162,831 | 11/1992 | Haraguchi et al. ............ 354/195.12 |
| 5,196,880 | 3/1993 | Ishibashi et al. ............... 354/400 |
| 5,214,462 | 5/1993 | Haraguchi et al. ............ 354/187 |

OTHER PUBLICATIONS

United Kingdom Search Report.
Reexam No. Re. 9002261, Haraguchi et al., dated May 25, 1993.

*Primary Examiner*—Richard A. Wintercorn
*Assistant Examiner*—Nicholas J. Tuccillo
*Attorney, Agent, or Firm*—Sandler, Greenblum & Bernstein

[57] ABSTRACT

A zoom lens barrel includes a code plate and brushes which selectively come into contact with the code plate to detect focal length variance during zooming, so that focal length data thus detected can be transmitted to a camera body through a flexible printed circuit (FPC) board, one of the code plate land brushes being secured to a mounting member and the other of the brushes or code plate being secured to a linearly movable member. The brushes are provided with elastically deformable lengths which can be connected to the FPC board, and a connecting portion thereof connected to the code plate. The mounting member or linearly movable member to which the brush assembly is secured is provided with an FPC board inserting groove with which the elastically deformable legs of the brushes can come into contact. The FPC board is provided with an insertion portion which is inserted between the FPC board inserting groove and the elastically deformable legs.

20 Claims 13 Drawing Sheets

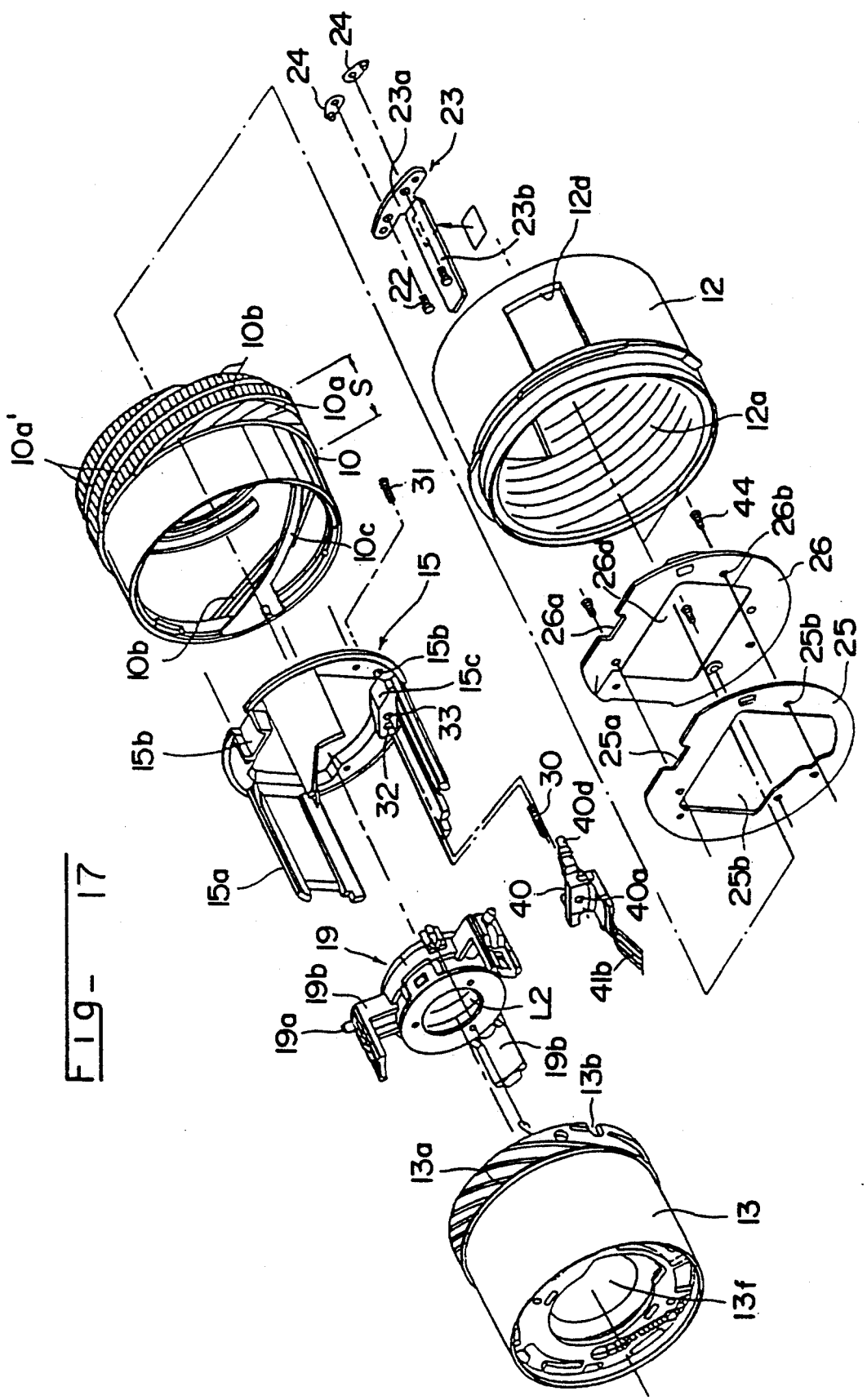

ZOOM LENS BARREL WITH FOCAL LENGTH DETECTOR

BACKGROUND OF THE INVENTION

1. Field of the Invention

The present invention relates to a zoom lens barrel, and more precisely, relates to a zoom lens barrel in which a change in focal length during zooming is detected by a zoom code plate together with zoom brushes which come into contact with the code plate, so that focal length data thus detected can be transmitted to a camera body through a flexible printed circuit (FPC) board.

2. Description of Related Art

For example, in a known zoom lens barrel having a cam ring which is rotated to effect the zooming, the change in focal length caused by the zooming is detected by a zoom code plate secured to a stationary ring of a camera together with zoom brushes which come into slide contact with the code plate during the rotation of the cam ring. The zoom code plate is provided with a predetermined pattern of contacts (contact pattern). Upon zooming, the zoom brushes are rotated together with the cam ring to come into slide contact with the zoom code plate, so that the focal length data corresponding to the focal length can be sent to a drive control circuit of the camera. Consequently, data necessary to control the camera is selected from each of a plurality of data tables of variable information and input to the drive control circuit of the camera body, in accordance with the focal length data.

In the known zoom lens barrel as mentioned above, in which the focal length data detected by the detecting means (zoom code plate together with zoom brushes) is sent to the drive control circuit of the camera body through the FPC board which is connected to the zoom brushes, the zoom brushes are soldered to the FPC board. The soldering is however, troublesome and costly.

Furthermore, since the control data corresponding to the detected focal length data is selected from each data table of variable information and is input to the drive control circuit of the camera body in accordance with the focal length data detected, it is absolutely necessary to accurately dispose the zoom brushes and the zoom code plate in predetermined reference positions. Otherwise, the angular position of the cam ring relative to the stationary ring of the camera body would not be accurately determined, thus resulting in a failure to detect a correct focal length during zooming.

Moreover, in a conventional zoom lens barrel, the zoom code plate is circumferentially secured to the outer peripheral surface of the stationary ring, and the zoom brushes secured to the cam ring are rotated on the zoom code plate in the circumferential direction of the stationary ring. Consequently, it is very difficult to establish an accurate and optimal relative position of the zoom code plate and the zoom brushes by a fine adjustment, for example, upon assembling. To this end, it is necessary to make the shape and position of the zoom code plate and the zoom brushes extremely precise, thus resulting in an increase of the manufacturing cost thereof.

In addition to the foregoing, since the operation of the camera is controlled in accordance with the focal length data detected by the zoom brushes which are brought into slide contact with the zoom code plate, the zoom brushes must be pressed against the zoom code plate at a constant predetermined pressure to accurately read the signals. This, however, requires an expensive and complex arrangement in the conventional zoom lens barrel.

SUMMARY OF THE INVENTION

A primary object of the present invention is to provide a zoom lens barrel in which the connection of zoom brushes to an FPC board can be simplified.

Another object of the present invention is to provide a zoom lens barrel in which the position of zoom brushes, provided between a code plate and an FPC board to connect the code plate, relative to the FPC board can be easily adjusted.

Still another object of the present invention is to provide a zoom lens barrel in which the relative position of a zoom code plate and zoom brushes can be easily adjusted.

Still another object of the present invention is to provide a simple zoom lens barrel in which zoom brushes are pressed onto a code plate at a substantially constant pressure to correctly read signals of focal length data.

According to the present invention, there is provided a zoom lens barrel comprising a code plate and a brush assembly which selectively comes into contact with the code plate to detect focal length variance during zooming, so that focal length data thus detected can be transmitted to a camera body through a flexible printed circuit (FPC) board, one of the code plate and brush assembly being secured to a mounting member and the other brush assembly or code plate being secured to a linearly movable member, which is movable with respect to the mounting member, and wherein said brush assembly is provided with one or more elastically deformable legs which can be connected to the FPC board, and a connecting portion thereof connected to the code plate; said mounting member or linearly movable member to which the brush assembly is secured is provided with an FPC board inserting groove with which the one or more elastically deformable legs of the brush assembly can come into contact; and said FPC board is provided with an insertion portion which is inserted between the FPC board inserting groove and the one or more elastically deformable legs.

According to another aspect of the present invention, there is provided a zoom lens barrel comprising a code plate and brushes which selectively come into contact with the code plate to detect focal length variance during zooming, so that focal length data thus detected can be transmitted to a camera body through a flexible printed circuit (FPC) board, one of the code plate and brushes being secured to a mounting member and the other of the brushes or code plate being secured to a linearly movable member, wherein said brushes are provided with elastically deformable legs and connecting portions thereof connected to the code plate; and said elastically deformable legs are elastically brought into contact with the FPC board.

According to still another aspect of the present invention, there is provided a zoom lens barrel comprising a code plate and brushes which selectively come into contact with the code plate to detect focal length variance during zooming, so that focal length data thus detected can be transmitted to a camera body through a flexible printed circuit (FPC) board, one of the code plate and brushes being secured to a mounting member and the other of the brushes or code plate being secured to a linearly movable member which is linearly moved in the optical axis direction during zooming. The zoom lens barrel comprises a brush holder which holds the brushes and which is held by the mounting member or the linearly movable member, a spring means for biasing the brush holder away from the mounting member or the linearly movable member, and a set screw which mounts the brush holder to the stationary member or the linearly movable member against the spring means.

According to still another aspect of the present invention, a zoom lens barrel includes a code plate and brushes having elastically deformable free ends which selectively come into contact with the code plate to detect focal length variance during zooming, one of the code plate and brushes being secured to a mounting member and the other of the brushes or code plate being secured to a linearly movable member. The zoom lens barrel comprises a brush holder which supports the brushes at the bases thereof, and a restricting member which is provided closer to the mounting member or linearly movable member than to the brush holder to thereby restrict the restoring force which tends to move the free ends of the brushes toward the code plate.

The present disclosure relates to subject matter contained in Japanese utility model application No. 4-24857 (filed on Apr. 17, 1992), No. 4-24858 (filed on Apr. 17, 1992), No. 4-24859 (filed on Apr. 17, 1992), No. 4-24860 (filed on Apr. 17, 1992), which are expressly incorporated herein by reference in their entirety.

BRIEF DESCRIPTION OF THE DRAWINGS

The present invention will be discussed below in detail with reference to the accompanying drawings, in which.

DESCRIPTION OF THE PREFERRED EMBODIMENT

Figure 15:
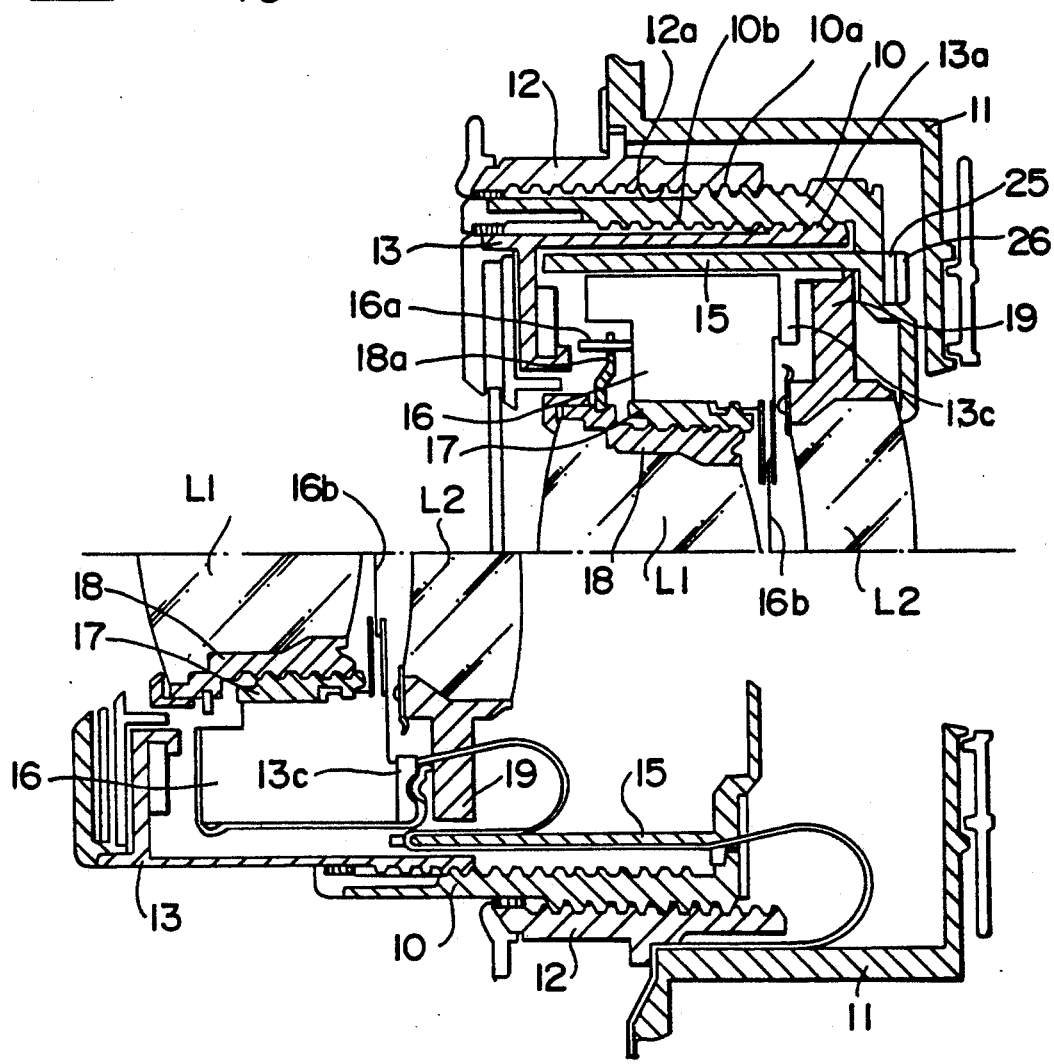
FIG. 15 is a sectional view of a zoom lens barrel according to the present invention.
Figure 16:
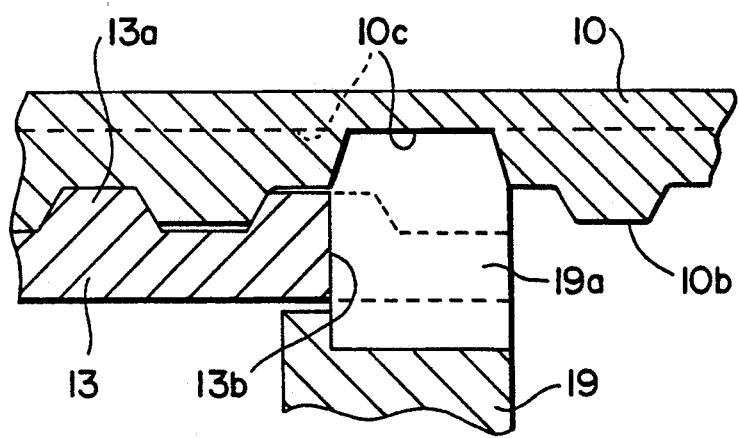
FIG. 16 is a sectional view of the main parts of the zoom lens barrel shown in FIG. 15; and, FIG. 17 is an exploded isometric view of the main parts of the zoom lens barrel shown in FIG. 15.

A zoom lens barrel to which the present invention is applied is generically discussed below with reference to FIGS. 15 and 17.

A stationary lens barrel 11 integral with a camera body is provided with a helicoid ring 12 secured thereto, which is provided with a multiple female thread 12a in which a multiple male thread 10a formed on an outer periphery of a cam ring 10 is screw-engaged. The cam ring 10 is provided on an inner peripheral surface thereof with a multiple female thread 10b and an inner cam groove 10c. A multiple male thread 13a of a front lens barrel 13 is screw-engaged in the multiple female thread 10b. Light intercepting plates 25 and 26 having openings 25d and 26d respectively corresponding to an aperture of the camera body are provided behind the rear end of the cam ring 10. The light intercepting plates 25 and 26 are provided on the upper ends thereof with positioning recesses 25a and 26a, so that a guide portion 23b of a linear movement guide 23 secured to the camera body can be fitted in the positioning recesses 25a and 26a of the light intercepting plates 25 and 26 and in a positioning recess 15b provided on a linear movement guide ring 15. The light intercepting plates 25 and 26 are secured to the linear movement guide ring 15, so that the positioning recesses 25a and 26a of the light intercepting plates 25 are aligned with the positioning recess 15b of the linear movement guide ring 15. The cam ring 10 is rotatably fitted on the linear movement guide ring 15. The linear movement guide 23 is secured to securing members 24 and to the camera body by set screws 22, so that the guide portion 23b of the linear movement guide 23 extends in an optical axis direction.

A shutter holding frame 13c to which a rear end of an annular shutter unit 16 is secured is secured to the front lens barrel 13. The shutter unit 16 is provided on an inner peripheral surface thereof with a helicoid ring 17 integral therewith, which is screw-engaged by a front lens frame 18 which holds a front lens group L1. The shutter unit 16 has a drive pin 16a which is engaged by a driven pin 18a provided on the front lens frame 18 integral therewith.

As is well known, the drive pin 16a is rotated in accordance with an object distance signal sent from an object distance meter (not shown), so that the rotation of the drive pin 16a is transmitted to the front lens frame 18 through the driven pin 18a. As a result, the front lens frame 18 and accordingly (the front lens group L1) are moved in the optical axis direction while being rotated to effect the focusing. The shutter unit 16 opens and closes shutter blades 16b in accordance with a brightness signal of an object to be taken. Numeral 13f designates a lens aperture 13f in FIG. 17.

A rear lens frame 19 which holds a rear lens group L2 has a cam pin 19a which projects in the radial direction and which is fitted in the inner cam groove 10c of the cam ring 10. The rear lens frame 19 and the shutter holding frame 13c are guided by linear movement guide surface plates 15a provided on the linear movement guide ring 15 so as to linearly move. The linear movement guide surface plates 15a of the linear movement guide ring 15 can be engaged by corresponding linear movement guide surface plates 19b of the rear lens frame 19, as shown in FIG. 17.

The cam pin 19a of the rear lens frame 19 is fitted in a recess 13b formed on a rear end surface of the front lens barrel 13 in an assembly. Consequently, when a multiple male thread 13a of the front lens barrel 13 is screw-engaged in the multiple female thread 10b of the cam ring 10, the cam pin 19a is fitted in the inner cam groove 10c. Upon completion of assembling, the front lens barrel 13 and the rear lens frame 19 are independently moved in the optical axis direction in accordance with the multiple threads 10b and 13a and the cam groove 10c, respectively, when the rotation of the cam ring 10 takes place.

Namely, in the zoom lens barrel as constructed above, when the cam ring 10 is rotated, the cam ring 10 is moved together with the linear guide movement guide ring 15 in the optical axis direction in accordance with the engagement of the multiple threads 10a and 12a. At the same time, the front lens barrel 13, and accordingly, the front lens group L1 are linearly moved in the same direction as the linear movement guide ring 15 moves along with the optical axis, and the barrel 13 is also linearly moved with respect to the cam ring 10 and the linear movement guide ring 15. The linear movement of the barrel 13 is attained by the screw-engagement of the multiple threads 10b and 13a and the linear movement guide mechanism of the shutter holding frame 13c and the linear movement guide ring 15. Furthermore, when the cam ring 10 is rotated, the rear lens frame 19, and accordingly the rear lens group L2 are moved in the same direction as the linear movement guide ring 15 moves along with the optical axis, and the rear lens frame 19 is also linearly moved with respect to the cam ring 10 and the linear movement guide ring 15. The linear movement of the rear lens frame 19 is attained by the engagement of the inner cam groove 10c of the cam ring and the cam pin 19a of the rear lens frame 19 and the linear movement guide mechanism of the rear lens frame 19 and the linear movement guide ring 15 to effect the zooming.

The cam ring 10 is provided on the rear portion thereof with a multiple male thread 10a and a plurality of parallel gears 10d, each consisting of a spur gear whose teeth are in parallel with the axis of the cam ring 10. The gears 10d are inclined in the same direction as the threads of the male thread 10a. Threads 10a' are provided between the adjacent gears 10d, respectively. Namely, one thread 10a' of the multiple thread 10a is provided between the two adjacent gears 10d. In other words, the multiple thread 10a is partly cut away in the circumferential direction so as to provide the threads 10a', so that the gears 10d are formed in the cut-away portions. In the illustrated embodiment, the multiple thread 10a consists of three threads, so that the gears 10d are provided in the cut-away portions of two of the three threads. The multiple thread 10a, threads 10a', and the gears 10d have the same axial length s.

The helicoid ring 12 is provided on the inner peripheral surface thereof with a multiple female thread 12a and relief grooves, etc., corresponding to the multiple male thread 10a, threads 10a' and three gears 10d of the cam ring 10, respectively. Namely, when the cam ring 10 is rotated in accordance with the screw-engagement of the multiple thread 10a (threads 10a') and the multiple thread 12a, the gears 10d are moved in the relief grooves without making contact.

The helicoid ring 12 is provided on the peripheral surface thereof with a recess 12d, so that a pinion (not shown) provided in the recess 12d can be engaged by the gears 10d. The pinion has an axial length (width) large enough to engage with at least one of the three gears 10d during the full travel of cam ring 10. Nevertheless, the pinion engages only with the rearmost gear 10d and the frontmost gear 10d at a front extremity position and a rear extremity position of the cam ring 10 in the axial direction, respectively. The pinion is driven by a drive motor (not shown).

The following discussion will be directed to an adjusting device in the present invention.

The adjusting device is comprised of a zoom mechanism which is driven by the rotation of the cam ring 10 to carry out the zooming, a zoom code plate 36 provided on the inner peripheral surface of the front lens barrel 13 (linearly moving member) which is linearly moved in the optical axis direction by the zoom mechanism, a brush holder 40 which holds zoom brushes 41 which are brought into contact with the code plate 36 to detect the current focal length, and a brush adjusting mechanism which adjusts the position of the brush holder 40 in the optical axis direction. Consequently, a reference angular position of the cam ring 10 is varied in accordance with the adjustment of the position of the brush holder by the brush adjusting mechanism. Provision is also made for a cam ring detecting means for detecting that the cam ring 10 is located in a predetermined reference angular position.

Figure 10:
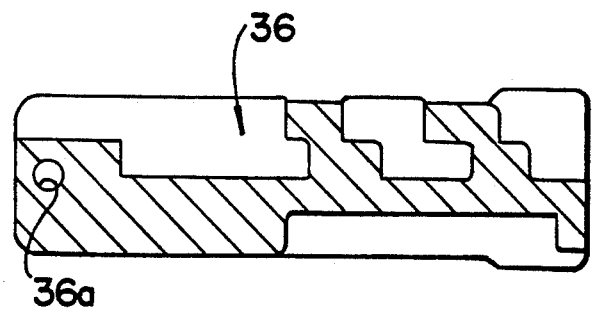
FIG. 10 is a sectional view of a zoom code plate, according to the present invention.

As can be seen in FIG. 10, the code plate 36 is provided with a predetermined pattern of contacts. During the zooming, when the zoom code plate 36 is moved together with the front lens barrel 13 in the optical axis direction, the brushes 41 selectively come into contact with the contact pattern, so that the digital signals (focal length data) corresponding to the current focal length are output to a drive control circuit (not shown) of the camera. In accordance with the focal length data, control data is selected from the associated data tables of variable information.

Figure 8:
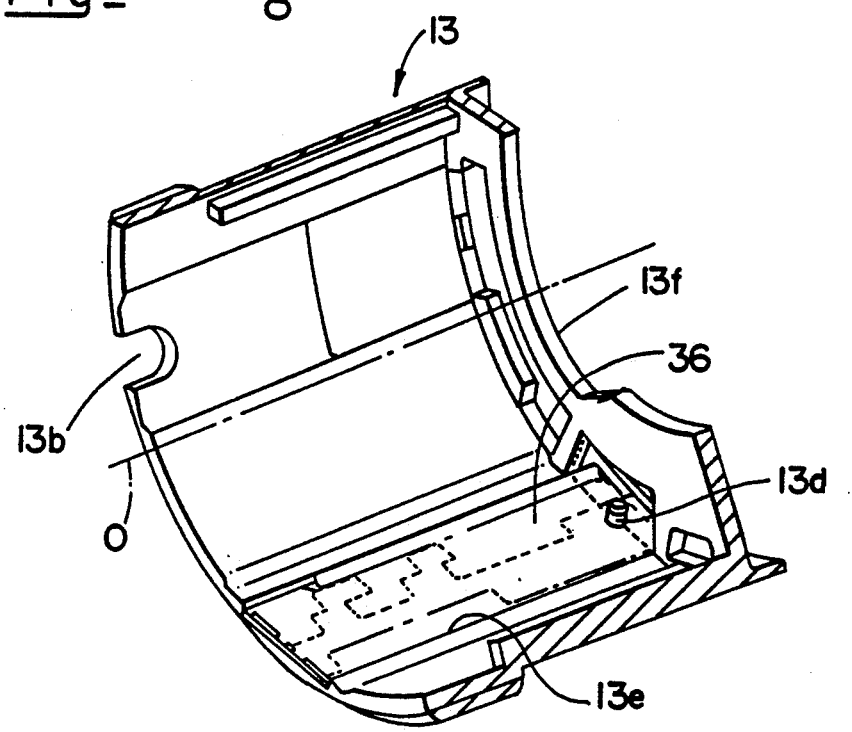
FIG. 8 is an isometric view of a zoom code plate provided on an inner surface of a front lens barrel, according to the present invention.
Figure 9:
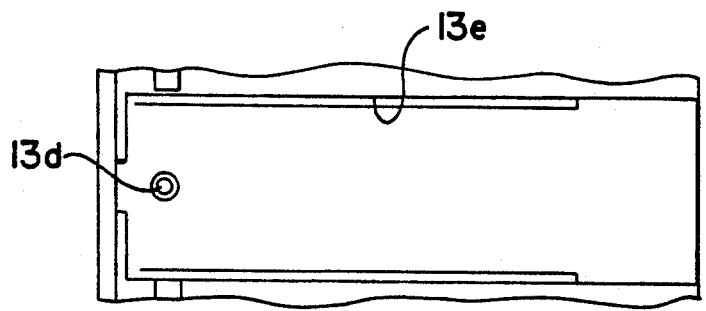
FIG. 9 is a plan view of the main parts of FIG. 8.

The front lens barrel 13 is provided on the inner peripheral surface thereof with an insertion groove 13e extending in parallel with the optical axis O. The insertion groove 13e (FIG. 8) is provided, on the end thereof adjacent to the photographing aperture 13f, with an engaging projection 13d which is engaged in a positioning hole 36a formed in one end of the zoom code plate 36. The zoom code plate 36 is restricted in a direction parallel with the optical axis when the engaging projection 13d is fitted in the positioning hole 36a. The zoom code plate 36 is firmly adhered at the back surface thereof to the bottom of the insertion groove 13e.

Figure 2:
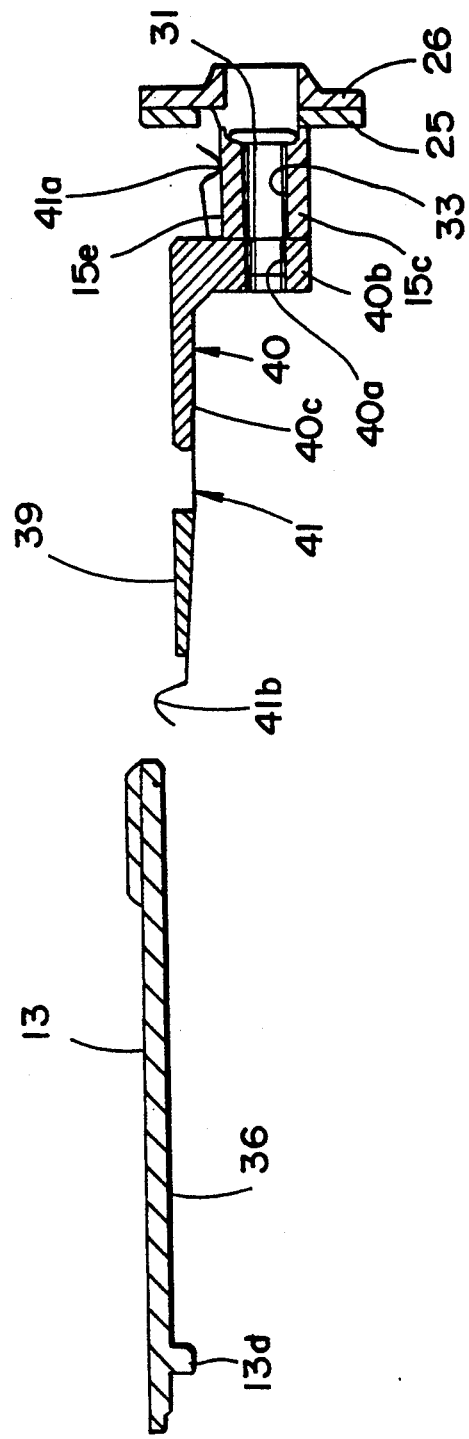
FIG. 2 is a side sectional view of a front lens barrel and zoom brushes disconnected therefrom, according to the present invention.
Figure 3:
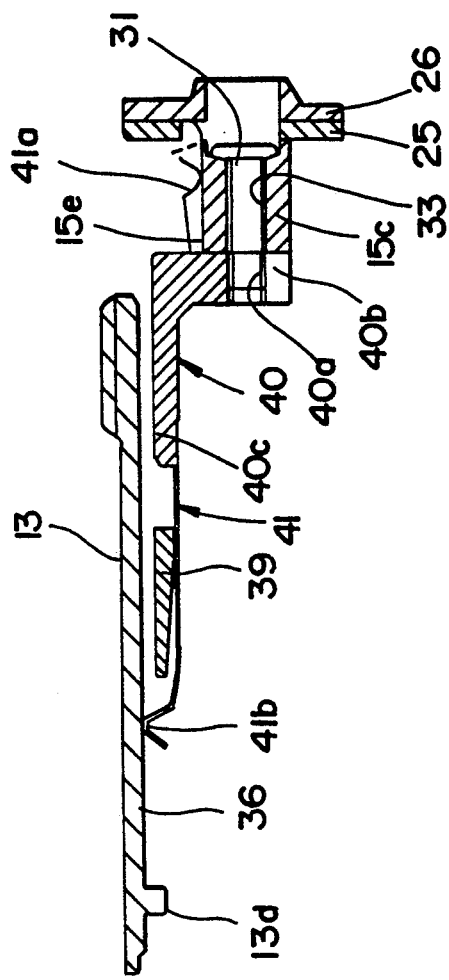
FIG. 3 is a side sectional view of a front lens barrel and zoom brushes inserted therein, according to the present invention.

The brush holder 40 is made of a generally L-shaped plate (side view) of synthetic resin, as shown in FIG. 2, and has an abutting portion 40b which comes into contact with a supporting portion 15c of the linear movement guide ring (mounting member) 15, and a positioning portion 40c which is adapted to support and position the four brushes 41 corresponding to the contact pattern of the zoom code plate 36. The supporting portion 15c has an insertion hole 33 in which a set screw (adjusting screw) 31 is inserted. The abutting portion 40b has a threaded hole 40a corresponding to the insertion hole 33. The brushes 41 are provided on one end thereof with elastically deformable output terminals (FPC board contacting legs) 41a which come into elastic contact with an associated terminal portion 37a of an FPC (flexible printed circuit board) 37 when the brush holder 40 is attached to the supporting portion (brush holding member) 15c by the set screw 31. At the other ends of the brushes 41 are provided input terminals (contact portions) 41b which are brought into slide contact with the zoom code plate 36.

The supporting portion 15c is also provided with a spring insertion hole 32 (FIGS. 1 and 17) adjacent to the screw insertion hole 33. The insertion hole 32 extends through the supporting portion 15c towards the abutting portion 40b, similarly to the screw insertion hole 33. A spacing spring (spring means) 30 is provided in the spring insertion hole 32 in a compressed state and contacts at one end with the brush holder 40 and at the other end with the light intercepting plate 26, respectively, so that the brush holder 40 supported by the supporting portion 15c is biased by the spacing spring in the direction away from the supporting portion 15c.

The screw insertion hole 33 is exposed through the insertion hole 26c (FIGS. 1, 11 and 12) formed in the light intercepting plate 26 to correspond to the screw insertion hole 33 of the linear movement guide ring 15 in an assembled state. The insertion hole 26c and the screw insertion hole 33 are located within the aperture A (FIG. 12). Consequently, the insertion hole 26c and the screw insertion hole 33 are exposed outside when a back cover (not shown) is opened.

In an assembled state in which the brush holder 40 is supported on the supporting portion 15c, when the set screw 31 is rotated to tighten or loosen the same, a slide movement of the brush holder 40 takes place in accordance with the angular displacement of the set screw (adjusting screw) 31, so that a relative position of the input terminals 41b of the brushes 41 to the zoom code plate 36 can be adjusted. Namely, the spacing spring 30 which biases the brush holder 40 away from the supporting portion 15c and the set screw (adjusting screw) 31 which mounts the brush holder 40 to the supporting portion 15c against the spacing spring 30 constitute a brush adjusting mechanism.

As can be understood from the above discussion, when the adjusting screw 31 is appropriately rotated after the back cover is opened, the relative position between the zoom code plate 36 and the zoom brushes 41 can be easily adjusted, and accordingly, the shape and position of the zoom code plate and the zoom brushes can be less precise than in the prior art. This results in a reduced manufacturing cost of the zoom lens barrel in comparison with the prior art.

Figure 1:
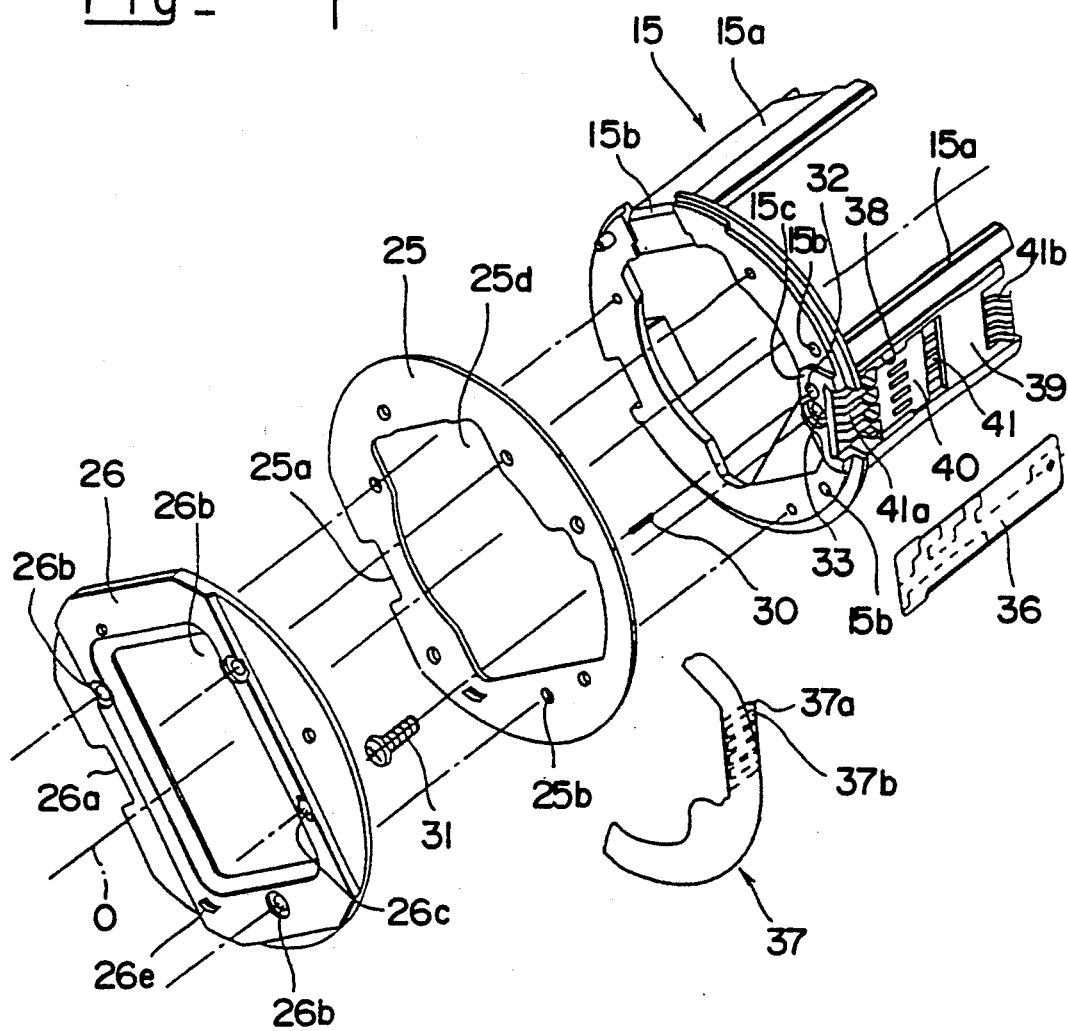
FIG. 1 is an exploded isometric view of a connecting device between a code plate and an FPC board, according to the present invention.

As can be seen in FIG. 1, the one of the three linear movement guide surface plates 15a that is provided with the supporting portion 15c is provided with a receiving groove 38 in which the brush holder 40 and the zoom brushes 41 are accommodated. The receiving groove 38 has a width substantially identical to the width of the brush holder 40. The one linear movement guide surface plate 15a is provided on the center portion thereof with a restriction wall (restricting member) 39 extending in the lateral direction of the receiving groove 38 to bridge the latter.

The restricting wall 39 restricts the input terminals 41b of the zoom brushes from assuming an extreme outward position in the direction of the zoom code plate 36, i.e. restricts the outward restoring force of the input terminals 41b. Thus, the input terminals 41b of the zoom brushes 41 can be stopped by a simple restraining wall 39 in the form of a cross member bridging the receiving groove 38.

The restricting wall 39 prevents the input terminals 41b of the zoom brushes 41 from contacting the zoom code plate with excessive pressure by restricting the restoring force of the input terminals 41b. Furthermore, the presence of the restricting wall 39 prevents the input terminals 41b from hitting the rear end of the front lens barrel 13 during assembly; thus, preventing damage to the input terminals 41b.

Figure 4:
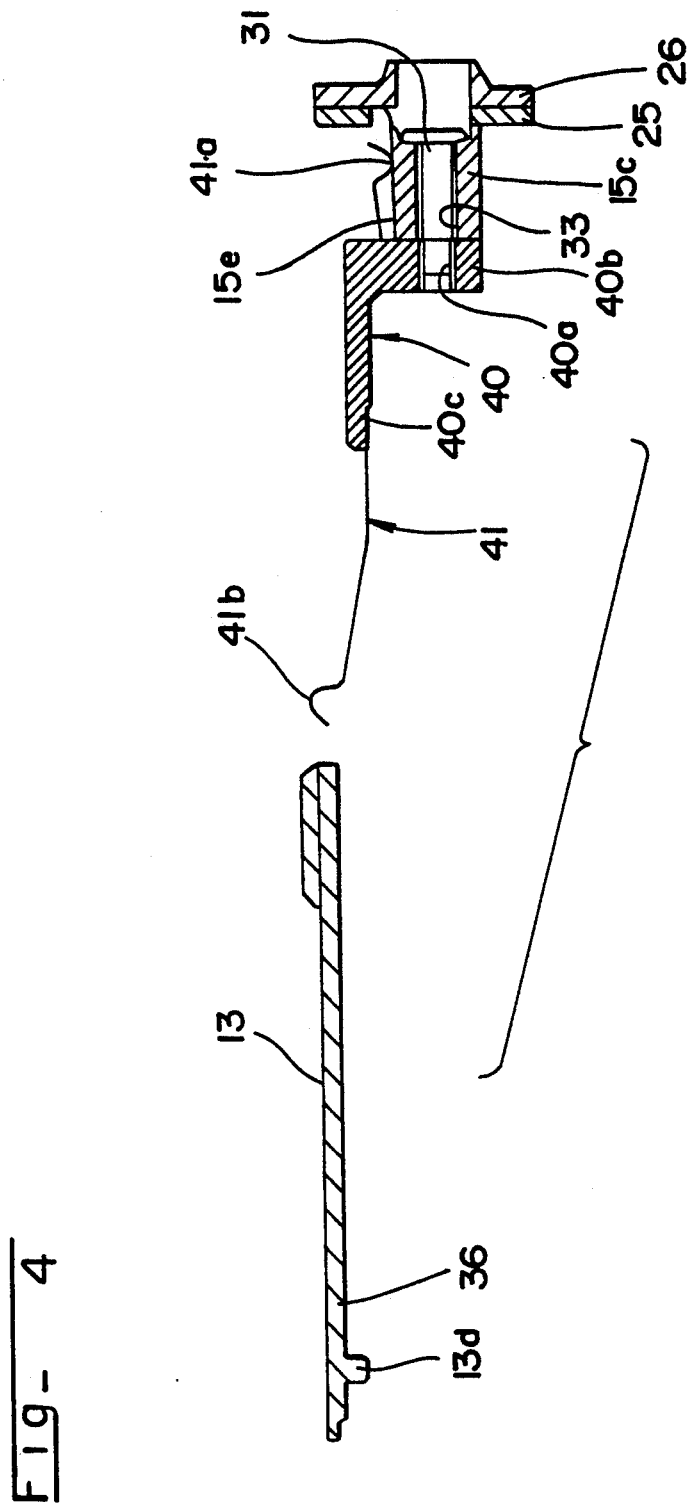
FIG. 4 is a side sectional view of a front lens barrel and zoom brushes with a removed restricting member, according to the present invention.

According to the present invention, the restricting wall 39 prevents the outward movement, due to restoring force, of the free ends of the brushes as shown in FIG. 4, which contributes to an essentially constant contact pressure between the brushes 41 and the code plate 36, so that the detection signals representing the focal length data can be correctly read.

The supporting portion 15c is provided with an outer flat surface portion 15e (FIGS. 2 and 5) on which the terminal portion 37a of the FPC board 37 is placed. The output terminals 41a of the brushes 41 elastically come into contact with the terminal portion 37a. The terminal portion 37a of the FPC board 37 constitutes an insertion portion to be inserted in a space defined between the flat surface portion 15e and the output terminals 41a. The terminal portion 37a is provided with conductive land portions 37b which extend in the direction of insertion and which are electrically connected to the output terminals 41a.

To mount the zoom brushes 41 to the receiving groove 38, the output terminals 41 are placed onto the flat surface portion 15e, and thereafter, the brush holder 40 is fitted in the receiving groove 38, so that the portions of the brushes 41 close to the input terminals 41b thereof bear against the rear surface of the restriction wall 39. The terminal portion 37a is inserted and held between the output terminals 41a and the flat surface portion 15e. Thus, the zoom brushes 41 can be easily and certainly connected to the FPC board 37 which is connected to the drive control circuit of the camera body.

Even after the connection is established between the zoom brushes 41 and the FPC board 37, the output terminals 41a of the zoom brushes 41 can slide on the terminal portion 37a of the FPC board 37. Consequently, in the present invention, it is not necessary to provide a bent or loosened portion on the FPC board in advance to enable the latter to be extended or contracted; nor is it necessary to provide a space to absorb the loosened portion, unlike the prior art in which the zoom brushes are soldered to the FPC board.

The slidability of the brushes 41 relative to the FPC board 37 will be discussed below with reference to FIGS. 5 through 7.

Figure 5:
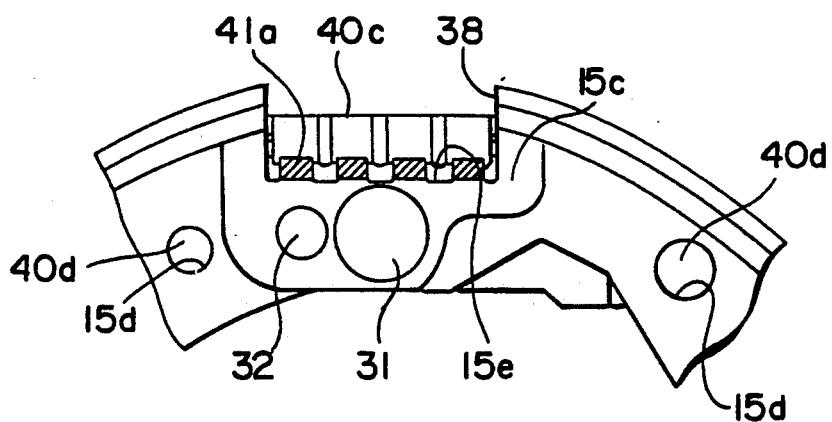
FIG. 5 is a back view of a code plate and an FPC board shown in FIG. 3.

In FIG. 5, the receiving groove 38 is in the form of a long, generally U-shaped groove having an open upper end. The terminal portion 37a of the FPC board 37 is held only by the flat surface portion 15e and the output terminals 41a.

Figure 6:
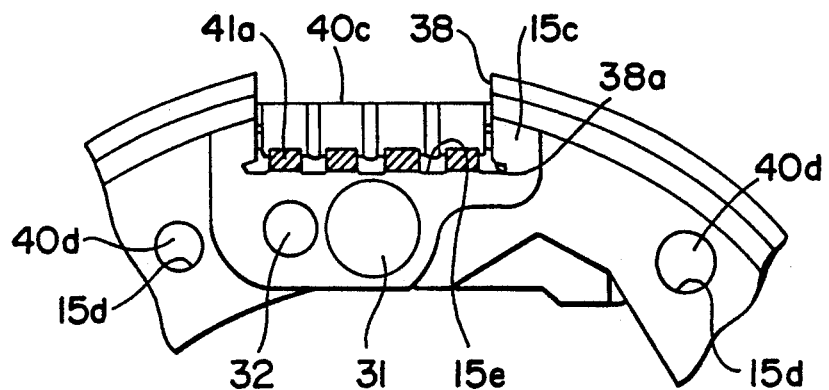
FIG. 6 is a back view of a modified arrangement of a code plate and an FPC board shown in FIG. 5, wherein a guide groove is slightly modified.

As shown in FIG. 6, it is possible to provide the receiving groove 38 with engaging recesses 38a at opposite sides of the bottom edge thereof to prevent more certainly the output terminals 41a of the zoom brushes 41 from being elastically and upwardly deformed.

Figure 7:
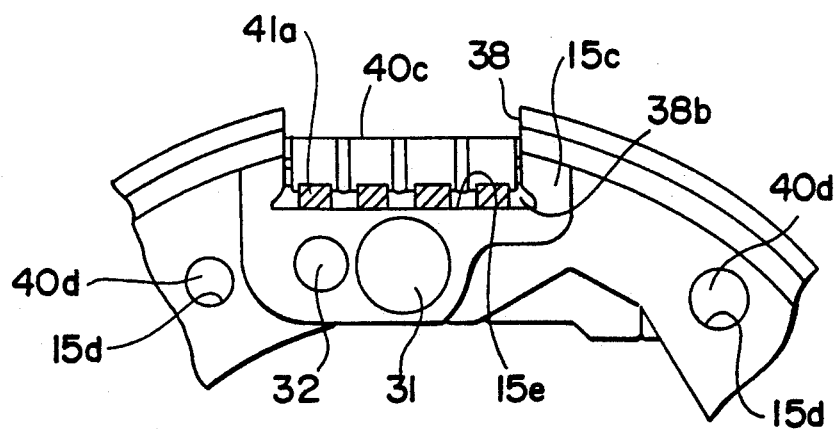
FIG. 7 is a back view of a modified arrangement of a code plate and an FPC board shown in FIG. 6, wherein a guide groove is slightly modified.

Alternatively, it is also possible to provide a receiving groove 38 in the form of a dove-tail 38b as shown in FIG. 7 to prevent more certainly the output terminals 41a of the zoom brushes 41 from being elastically and upwardly deformed, instead of the receiving groove 38 having the recesses 38a shown in FIG. 6.

The supporting portion 15c shown in FIG. 5, 6 or 7 is provided with right and left guide holes 15d in which right and left guide projections 40d provided on the brush holder 40 are slidably inserted. Consequently, the input terminals 41b can slide smoothly on the zoom code plate 36 without changing the relative position therebetween in the direction perpendicular to the direction of the slide movement.

As can be seen in FIG. 17, the linear movement guide ring 15 is provided with a pair of guide holes 15d on opposite sides of the supporting portion 15c, so that when the guide projections 40d of the brush holder 40 are slidably inserted in the corresponding guide holes 15d, the input terminals 41b can slide smoothly relative to the zoom code plate 36 without changing the relative position therebetween in the direction perpendicular to the direction of the slide movement.

For a specific focal length, the position of the zoom code plate 36 relative to the zoom brushes 41 coming into slide contact with the code plate should always be the same according to design. If the relative position between the zoom brushes 41 and the linear movement guide ring 15 in the optical axis direction is different, for example due to a manufacturing error, etc., the relative position between the linear movement guide ring 15 and the zoom code plate 36 changes, thus resulting in an error of the angular position of the cam ring 10.

To prevent this, it is necessary to adjust and confirm the relative position of the zoom brushes 41 and the zoom code plate 36 in the optical axis direction in accordance with an appropriate position of the front lens barrel, for example, in the most contracted position of the lens barrel at which the cam ring 10 is at a predetermined angle position. To this end, in the present invention, provision is made for a cam ring detecting means for detecting or confirming the position of the cam ring 10, which will be described below with reference to FIGS. 11 and 12.

The light intercepting plates 25 and 26 are secured to the linear movement guide ring 15 by set screws 44 (FIG. 17) which are inserted in corresponding insertion holes 25b and 26b formed in the light intercepting plates 25 and 26, respectively, and are screwed in threaded holes 43 of the linear movement guide ring 15. The first light intercepting plate 25 has a view window 25e provided on the left side of the positioning recess 25a, and the second light intercepting plate 26 has a view window 26e corresponding to the view window 25e of the light intercepting plate 25.

The light intercepting plates 25 and 26 are shaped so that they are larger than the rear surface of the linear movement guide ring 15 and smaller than the contour of the cam ring 10. The view windows 25e and 26e correspond to the rear end surface 10e of the cam ring 10 and are in the form of an elongated opening extending in the circumferential direction of the rear end surface 10e.

The cam ring 10 is provided on the rear end surface 10e thereof with a mark 45 represented by two points (small circles) which appear in the view windows 25e and 26e only when the cam ring 10 is positioned in a predetermined correct angle position.

Figure 11:
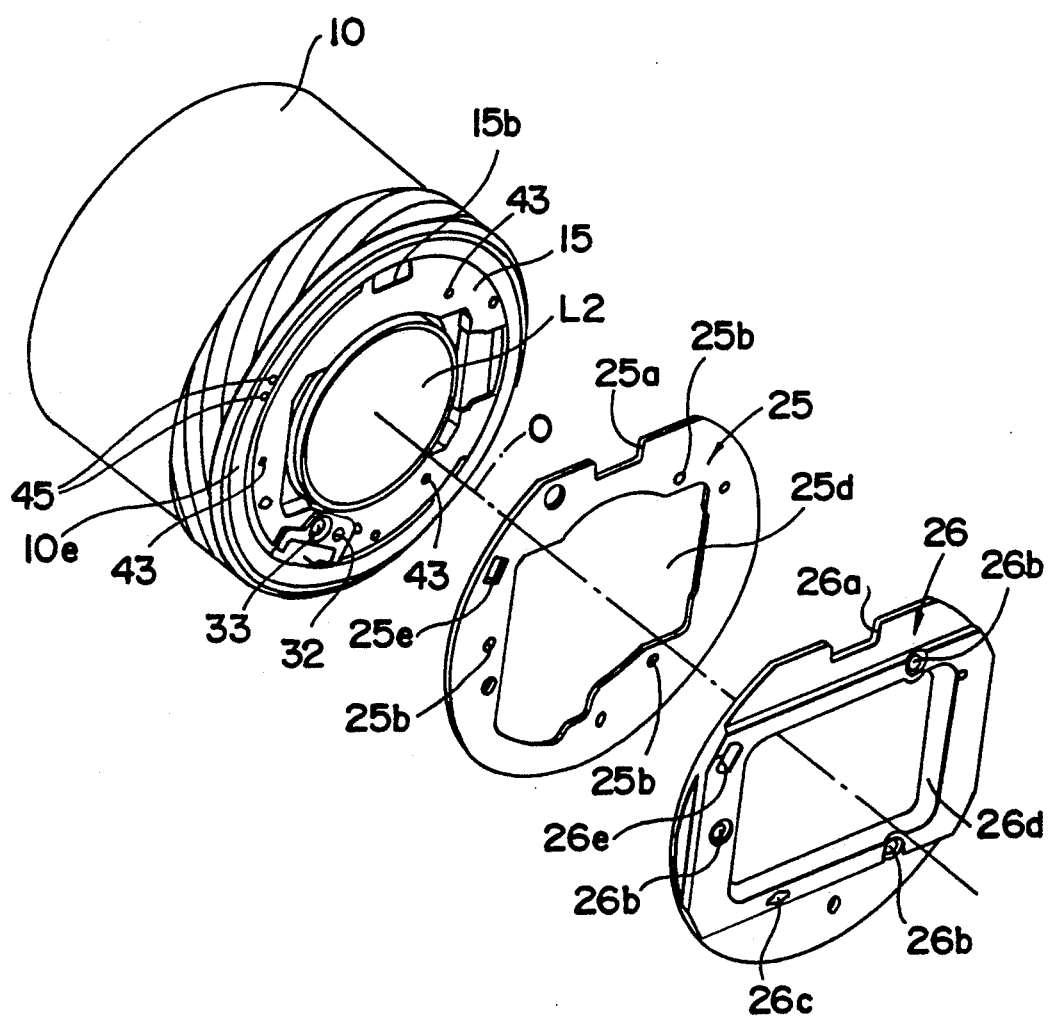
FIG. 11 is an exploded isometric view of an assembly of an adjusting mechanism, according to the present invention.
Figure 12:
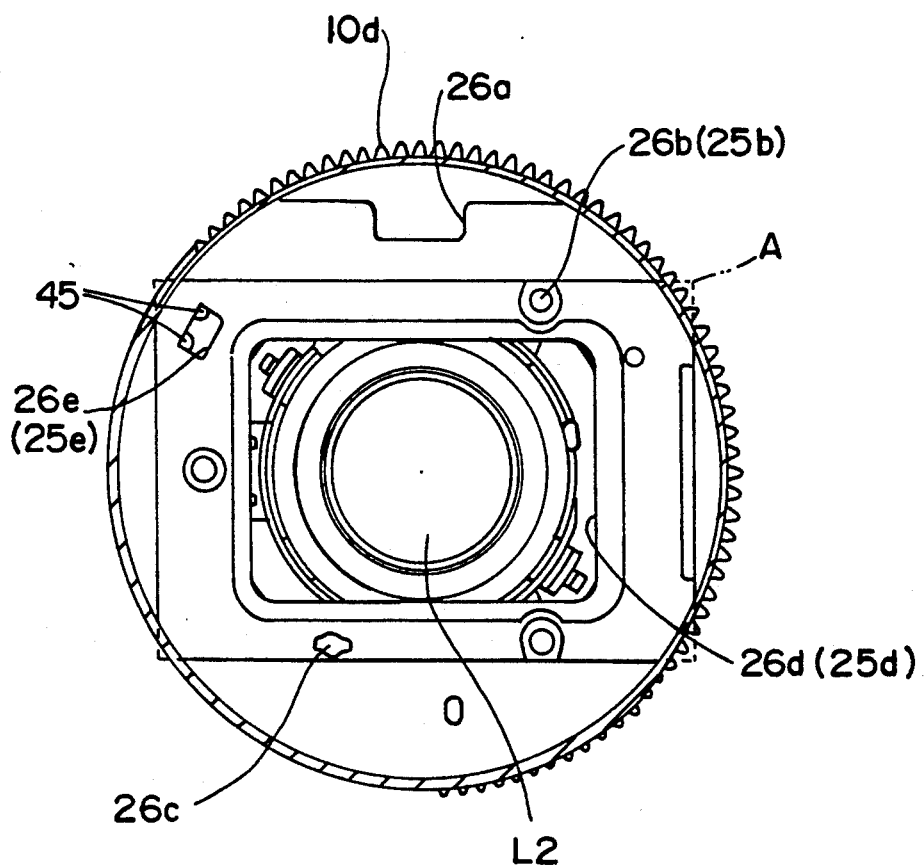
FIG. 12 is a back view of FIG. 11.

When the linear movement guide ring 15 is correctly arranged in the camera body, the positioning recess 15b of the linear movement guide ring 15 is located at the upper and center portion thereof, as shown in FIGS. 11 and 12. In this state, for example upon assembling, the brush adjusting device can be manually actuated by rotating the set screw 31 in the screw insertion hole 33 in the clockwise or counterclockwise direction, using a screw-driver (not shown) which is inserted through the insertion hole 26c of the light intercepting plate 26.

When testing the relationship between the position of the zoom ring 10 and the relative position of the zoom brushes 41 and the zoom code plate 36, the camera body sub-assembly is placed in a test machine with a drive motor. The drive motor is driven in accordance with the manual movement as described above of the zoom brushes 41 relative to the zoom code plate 36. The motor in turn drives the cam ring 10 through the gears 10d.

Consequently, the cam ring 10 is moved in the optical axis direction while being rotated, in accordance with the engagement of the multiple threads 10a (10a') and 12a, etc., to vary the relative position of the front lens group L1 and the rear lens group L2 to thereby carry out the zooming. Since the mark 45 provided on the rear end surface 10e of the cam ring 10 is exposed through the view window 26e when the input terminals 41b of the zoom brushes 41 are correctly positioned with respect to the code plate 36, the set screw 31 can be rotated in the clockwise or counterclockwise direction using a screw-driver while view window 26e is observed until the two points of the mark 45 appear in the view window 26e, as shown in FIG. 12. Namely, when the two points of the mark 45 appear in the view window 26e, as shown in FIG. 12, the fact that the cam ring 10 is correctly positioned can be confirmed.

Figure 13:
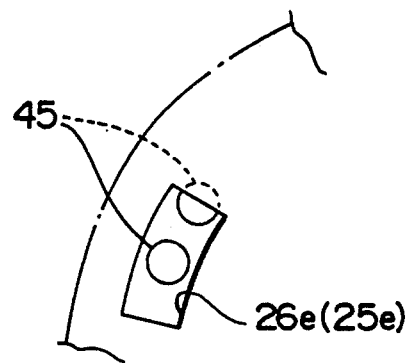
FIGS. 13 and 14 are explanatory views of a view window in which a mark of an adjusting device appears, shown in different positions, according to the present invention.
Figure 14:
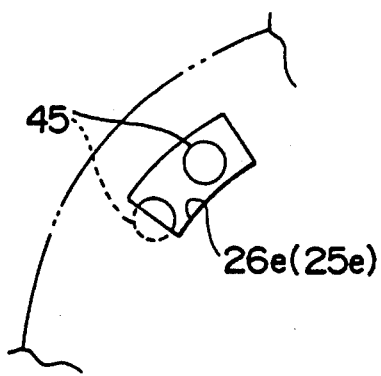

It should be appreciated that it is not always necessary for the entirety of the two points of the mark 45 to appear in the view window to confirm that the cam ring 10 is correctly positioned, as shown in FIG. 12. Namely, when more than one-half the surface area of one of the two points (small circles) of the mark 45 appear in the view window 26e and the other point entirely appear in the view window 26e, as shown in FIGS. 13 and 14, the cam ring 10 can be judged to be correctly positioned.

Note that the shapes of the mark 45 and the view window 26e (25e) are not limited to those in the illustrated embodiment. Namely, any confirming means for visually confirming or detecting the position of the cam ring 10 relative to the light intercepting plates 25 and 26 can be used.

As can be understood from the above discussion, according to the present invention, since the communication link between the code plate and the FPC board can be easily and certainly secured without a troublesome operation such as soldering, the connecting operation can be simplified and the manufacturing cost can be reduced.

Furthermore, according to the present invention, since the brushes are provided with elastically deformable legs which can be elastically brought into contact with the FPC board and the code plate, the communication link between the code plate and the FPC board can be easily and certainly secured without a troublesome operation such as soldering, thus resulting in a simple connecting operation and a reduced manufacturing cost.

Moreover, since the elastically deformable legs of the brushes are slidable on the FPC board, it is not necessary to provide the FPC board with a bent or loosened portion which enables the FPC board to be extended or contracted, unlike the prior art in which such a bent or loosened portion is required. Consequently, a space for accommodating the loosened portion is not necessary in the present invention.

Furthermore, according to the present invention, the relative position of the code plate and the brushes can be easily adjusted by rotating the set screw (adjusting screw) in the clockwise or counterclockwise direction. Thanks to the adjustability of the relative position of the code plate and the brushes, it is not necessary to manufacture the shapes of the code plate and the brushes with extreme precision, or to accurately position the code plate and the brushes. This also leads to a reduction of the manufacturing cost of the zoom lens barrel, according to the present invention.

In addition to the foregoing, according to the present invention, since the brushes are secured at the bases thereof to the brush holder, and the restricting member is provided on the stationary member of the camera body to restrict the movement of the free ends of the brushes toward the code plate, which contributes to an essentially constant contact pressure, the control signals can be correctly read.

Although the invention has been described with reference to particular means, materials and embodiments, it is to be understood that the invention is not limited to the particulars disclosed and extends to all equivalents within the scope of the claims.

We claim:

1. A zoom lens barrel comprising a code plate and a brush assembly which selectively comes into contact with the code plate to detect focal length variance during zooming, so that focal length data thus detected can be transmitted to a camera body through a flexible printed circuit (FPC) board, one of the code plate and brush assembly being secured to a mounting member and the other of the brush assembly or code plate being secured to a linearly movable member, said linearly movable member being movable with respect to said mounting member, wherein
   said brush assembly is provided with at least one elastically deformable leg which can be connected to the FPC board, and a connecting portion thereof connected to the code plate;
   said mounting member or linearly movable member to which the brush assembly is secured is provided with an FPC board inserting groove with which the at least one elastically deformable leg of the brush assembly can come into contact; and
   said FPC board is provided with an insertion portion which is inserted between the FPC board inserting groove and the at least one elastically deformable leg.

2. A zoom lens barrel according to claim 1, wherein said insertion portion of the FPC board comprises by a terminal portion provided on the FPC board and having a conductive land portion extending in the direction of insertion of the FPC board.

3. A zoom lens barrel according to claim 1, wherein said linearly movable member is a front lens barrel which is moved in an optical axis direction during zooming.

4. A zoom lens barrel according to claim 3, wherein said front lens barrel is provided, on an inner peripheral surface thereof, with an insertion groove in which the code plate can be inserted and which extends in a direction parallel with the optical axis.

5. A zoom lens barrel according to claim 4, wherein said code plate is provided on one end thereof with a positioning hole, and wherein said insertion groove is provided, on one end thereof adjacent to a photographing aperture of the front lens barrel, with an engaging projection which can be fitted in the positioning hole.

6. A zoom lens barrel comprising a code plate and brushes which selectively come into contact with the code plate to detect focal length variance during zooming, so that focal length data thus detected can be transmitted to a camera body through a flexible printed circuit (FPC) board, one of the code plate and brushes being secured to a mounting member and the other of the brushes or code plate being secured to a linearly movable member which is linearly moved in an optical axis direction with respect to said mounting member during zooming, comprising:
   a brush holder which holds the brushes and which is held by one of the mounting member or the linearly movable member;
   a spring means for biasing the brush holder away from said one of the mounting member or the linearly movable member; and
   a set screw which mounts the brush holder to one of the mounting member or the linearly movable member against the spring means.

7. A zoom lens barrel according to claim 6, wherein said mounting member is a linear movement guide ring which guides linear movement of the front lens barrel in the optical axis direction.

8. A zoom lens barrel according to claim 7, further comprising a brush holder which supports the brushes, and wherein said linear movement guide ring is provided with a supporting portion.

9. A zoom lens barrel according to claim 8, wherein said brush holder is provided with an abutting portion which comes into contact with the supporting portion of the linear movement guide ring.

10. A zoom lens barrel according to claim 9, wherein said brush holder is supported on said supporting portion, and wherein said supporting portion of the linear movement guide ring is provided with a screw insertion hole in which the adjusting screw is inserted.

11. A zoom lens barrel according to claim 10, wherein said abutting portion is provided with a threaded hole corresponding to the screw insertion hole of the supporting portion.

12. A zoom lens barrel according to claim 11, wherein said supporting portion is provided with a spring insertion hole located adjacent to the screw insertion hole and extending through the supporting portion to open into the abutting portion.

13. A zoom lens barrel according to claim 12, further comprising a compression spring which is provided in the spring insertion hole in a compressed state to space the brush holder from the supporting portion.

14. A zoom lens barrel according to claim 13, wherein rotation of the adjusting screw causes the brush holder and the brushes held thereby to slide relative to the code plate in accordance with the angular displacement of the adjusting screw.

15. A zoom lens barrel according to claim 14, further comprising a light intercepting plate which is provided optically behind the linear movement guide ring and which does not rotate relative to the linear movement guide ring.

16. A zoom lens barrel according to claim 15, wherein said light intercepting plate is provided with an exposure opening corresponding to the screw insertion hole of the linear movement guide ring so that the screw insertion hole can be exposed to the outside through the exposure opening.

17. A zoom lens barrel comprising a code plate and brushes having elastically deformable free ends which selectively come into contact with the code plate to detect focal length variance during zooming, one of the code plate and brushes being secured to a mounting member and the other of the brushes or code plate being secured to a linearly movable member, said linearly movable member being movable with respect to said mounting member, comprising:

a brush holder which supports the brushes at bases thereof; and a restricting member which is provided closer to one of the mounting member or linearly movable member than to the brush holder to thereby restrict the restoring force which tends to move the free ends of the brushes toward the code plate.

18. A zoom lens barrel according to claim 17, wherein said mounting member is a linear movement guide ring extending in the optical axis direction.

19. A zoom leans barrel according to claim 18, wherein said linear movement guide ring is provided with a plurality of linear movement guide surfaces, at least one of which is provided with a receiving groove in which the brush holder and the brushes are received, wherein said receiving groove has a width substantially identical to the width of the brush holder.

20. A zoom lens barrel according to claim 19, wherein said restricting member is defined by a wall which bridges the receiving groove substantially at the center of the associated linear movement guide surface.

* * * * *

UNITED STATES PATENT AND TRADEMARK OFFICE
CERTIFICATE OF CORRECTION

PATENT NO. : 5,327,184
DATED : July 5, 1994
INVENTOR(S) : Hiroshi NOMURA et al.

It is certified that error appears in the above-indentified patent and that said Letters Patent is hereby corrected as shown below:

Column 11, line 56 (claim 2, line 2), change "comprises by a" to ---comprises a---.

Signed and Sealed this

Fourteenth Day of March, 1995

Attest:

BRUCE LEHMAN

*Attesting Officer*     *Commissioner of Patents and Trademarks*